US012065330B2

(12) United States Patent
Dhumal et al.

(10) Patent No.: US 12,065,330 B2
(45) Date of Patent: Aug. 20, 2024

(54) DYNAMIC ELEVATOR DOOR CONTROL

(71) Applicant: Otis Elevator Company, Farmington, CT (US)

(72) Inventors: Tejas Arunrao Dhumal, Maharashtra (IN); Guru Charan Kottur, Telangana (IN); Aditya Swami, Telangana (IN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1380 days.

(21) Appl. No.: 16/565,877

(22) Filed: Sep. 10, 2019

(65) Prior Publication Data

US 2020/0087115 A1 Mar. 19, 2020

(30) Foreign Application Priority Data

Sep. 14, 2018 (IN) ............................ 201811034756

(51) Int. Cl.
*B66B 13/14* (2006.01)
*B66B 1/34* (2006.01)
(Continued)

(52) U.S. Cl.
CPC .......... *B66B 13/146* (2013.01); *B66B 1/3461* (2013.01); *B66B 1/468* (2013.01);
(Continued)

(58) Field of Classification Search
CPC .................. B66B 1/468; B66B 5/0012; B66B 2201/4615; B66B 2201/4653; B66B 1/2408; B66B 3/002; B66B 2201/4676; B66B 2201/463; B66B 2201/103; B66B 2201/211; B66B 2201/4638;
(Continued)

(56) References Cited

U.S. PATENT DOCUMENTS 5,518,086 A 5/1996 Tyni
8,151,943 B2 4/2012 De Groot
(Continued)

FOREIGN PATENT DOCUMENTS

CN 105460757 A 4/2016
CN 105883558 A 8/2016
(Continued)

OTHER PUBLICATIONS

European Search Report for application EP 19196950.0, dated Mar. 31, 2020, 68 pages.
(Continued)

*Primary Examiner* — Marlon T Fletcher
(74) *Attorney, Agent, or Firm* — CANTOR COLBURN LLP

(57) ABSTRACT

A method for dynamic elevator door control is provided. The method is implemented by a system, which includes an elevator. The system procures passenger data, which can include a number of passengers presently travelling to a floor and a number of passengers awaiting to board at the floor. A determination is made by the system with respect a door operational time based on the passenger data. The system implements the door operational time to dynamically cause doors providing access to the elevator to remain open for a duration of the door operational time.

18 Claims, 4 Drawing Sheets

200

(51) Int. Cl.
*B66B 1/46* (2006.01)
*B66B 5/00* (2006.01)

(52) U.S. Cl.
CPC ...... *B66B 5/0012* (2013.01); *B66B 2201/103* (2013.01); *B66B 2201/405* (2013.01); *B66B 2201/4615* (2013.01); *B66B 2201/4653* (2013.01)

(58) Field of Classification Search
CPC ... B66B 1/3461; B66B 2201/222; B66B 1/34; B66B 2201/403; B66B 2201/232; B66B 2201/104; B66B 1/52; B66B 1/3407; B66B 13/26; B66B 2201/4607; B66B 13/00; B66B 13/02; B66B 13/22
See application file for complete search history.

(56) References Cited

U.S. PATENT DOCUMENTS

| | | | | |
|---|---|---|---|---|
| 2012/0020518 | A1 | 1/2012 | Taguchi | |
| 2013/0048436 | A1 | 2/2013 | Chan | |
| 2015/0073748 | A1 | 3/2015 | Mattsson et al. | |
| 2016/0251199 | A1 | 9/2016 | Kronkvist et al. | |
| 2020/0087115 | A1* | 3/2020 | Dhumal | B66B 1/3461 |

FOREIGN PATENT DOCUMENTS

| | | | | | |
|---|---|---|---|---|---|
| CN | 205873544 | U | | 1/2017 | |
| CN | 106744094 | A | | 5/2017 | |
| CN | 110902539 | A | * | 3/2020 | B66B 1/3461 |
| JP | H0687384 | U | | 12/1994 | |
| JP | 20010302122 | A | | 10/2001 | |
| JP | 2010058859 | A | * | 3/2010 | |
| JP | 2013124144 | A | | 6/2013 | |
| JP | 2013124144 | A | * | 6/2013 | |
| JP | 2014131932 | A | | 7/2014 | |
| JP | 5784051 | B2 | | 9/2015 | |
| JP | 2015224132 | A | | 12/2015 | |
| JP | WO2017221296 | A1 | * | 6/2016 | |
| JP | 5955517 | B2 | * | 7/2016 | |
| JP | 2018002457 | A | | 1/2018 | |
| KR | 102486305 | B1 | * | 1/2023 | |
| WO | WO-2007096947 | A1 | * | 8/2007 | B66B 1/2458 |
| WO | 2014016906 | A1 | | 1/2014 | |
| WO | 2016135114 | A1 | | 9/2016 | |

OTHER PUBLICATIONS

Mitsubishi Electric, “Elevator Group Control System, EAI-2200C Artificial Intelligence System”, available at: https://www.mitsubishielevator.com/images/uploads/documents/pdf/elevators/high-speed/AI-2200C-_Updated.pdf, accessed: Sep. 10, 2019, 6 pages.
Chinese Office Action for Application No. 201910863583.3; Issued Jan. 20, 2022; 11 Pages.

* cited by examiner

DYNAMIC ELEVATOR DOOR CONTROL

FOREIGN PRIORITY

This application claims priority to Indian Patent Application No. 201811034756, filed Sep. 14, 2018, and all the benefits accruing therefrom under 35 U.S.C. § 119, the contents of which in its entirety are herein incorporated by reference.

BACKGROUND

In general, a greater a number of passengers utilizing an elevator, a greater an amount of time required for those passengers to move in and out of the elevator. Currently, a door close time for elevator doors is irrespective of the number of passengers utilizing the elevator. In fact, it is common for the elevator doors to begin to close while the passengers are moving in and out the elevator when the passengers utilize more time than the door close time allows.

BRIEF DESCRIPTION

In accordance with one or more embodiments, a method for dynamic elevator door control is provided. The method is implemented by a system, which includes an elevator. The system procures passenger data, which can include a number of passengers presently travelling to a floor and a number of passengers awaiting to board at the floor. A determination is made by the system with respect a door operational time based on the passenger data. The system implements the door operational time to dynamically cause doors providing access to the elevator to remain open for a duration of the door operational time.

In accordance with one or more embodiments or the method embodiment above, the door operational time can be summation of one or more individual time intervals corresponding to a total passenger number based on the number of passengers presently travelling to the floor and the number of passengers awaiting to board at the floor.

In accordance with one or more embodiments or any of the method embodiments above, the one or more individual time interval can include a default time interval for a common passenger and an increased time interval for an elderly passenger.

In accordance with one or more embodiments or any of the method embodiments above, the default time value can be two seconds.

In accordance with one or more embodiments or any of the method embodiments above, the system can automatically receive one or more elevator calls from one or more mobile devices including source and destination information, the system being in communication with the one or more mobile devices via a network.

In accordance with one or more embodiments or any of the method embodiments above, the passenger data can be derived from health profile information of the one or more users based on the one or more elevator calls.

In accordance with one or more embodiments or any of the method embodiments above, the system can determine whether any special accommodations are required for the passengers presently travelling to the floor and the passengers awaiting to board at the floor.

In accordance with one or more embodiments or any of the method embodiments above, the special accommodation can be determined by at least one sensor utilizing image recognition technology that detects a mobility aid.

In accordance with one or more embodiments or any of the method embodiments above, the system can monitor an access progress of the at least one elevator for the duration of the door operational time to determine whether to dynamically increase the door operational time.

In accordance with one or more embodiments or any of the method embodiments above, the system can detect the number of passengers awaiting to board at the floor based on a sensor detects one or more users in a lobby of the floor.

In accordance with one or more embodiments, any of the method embodiments above can be implemented as a system and/or computer program product.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
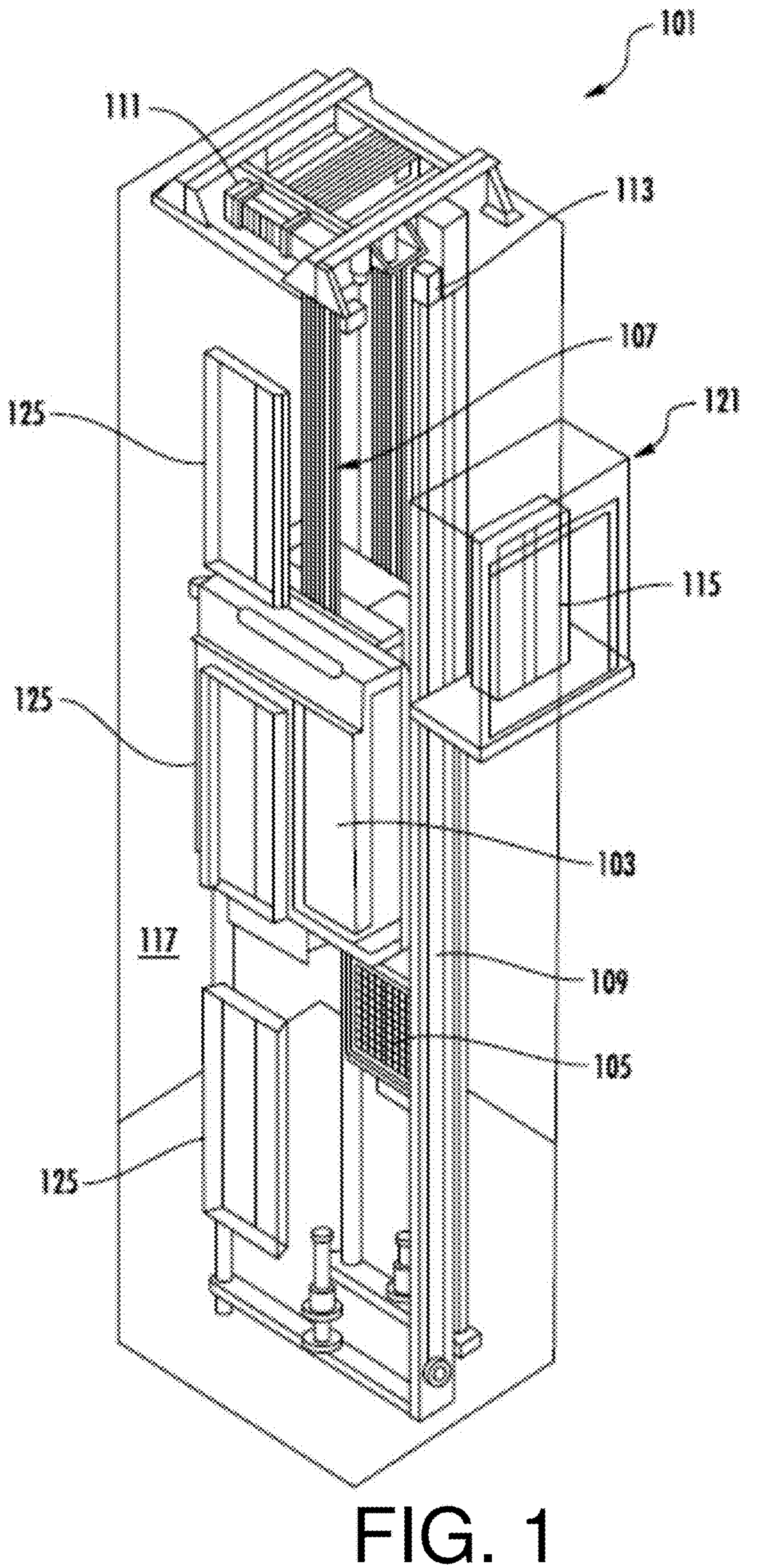
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

Figure 2:
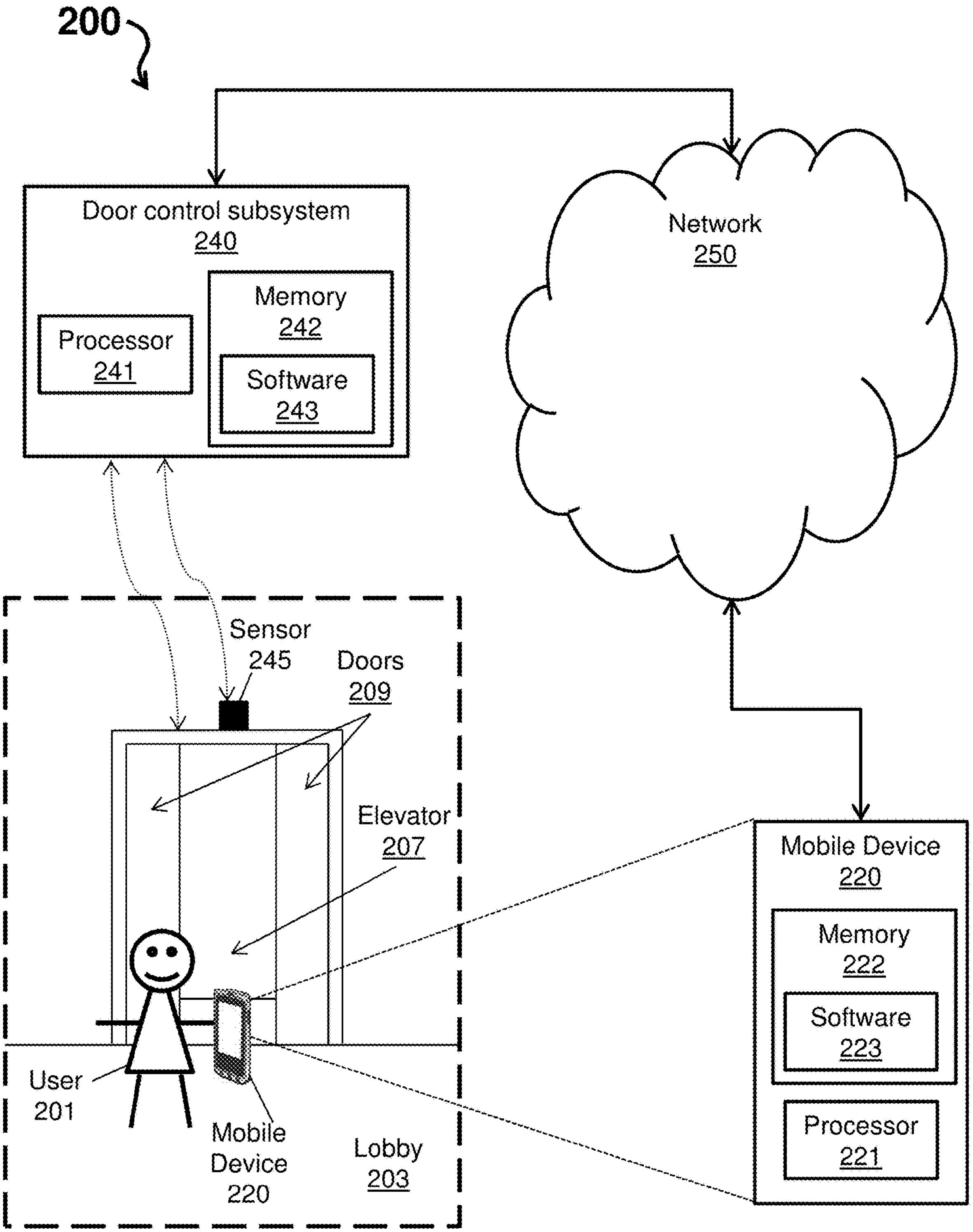
FIG. 2 depicts a system for dynamic elevator door control in accordance with one or more embodiments.

FIG. 2 depicts a schematic illustration of a system 200 for implementing dynamic elevator door control in accordance with one or more embodiments, which can be realized as processor-implemented methods and/or computer program products.

The system 200 is overlaid a building through which a user 201 can traverse. As shown in FIG. 2, the user 201 is in a lobby 203 awaiting an elevator 207 outside doors 209.

The user 201 has a mobile device 220 that is connected to and/or a part of the system 200. The mobile device 220 includes a processor 221 and a memory 222 with software 223 (e.g., mobile application) stored thereon. The user 201, further, desires transportation by the elevator 207 of the system 200.

The doors 209 (and/or the elevator 207 itself) is controlled by a door control subsystem 240. The door control subsystem 240 includes a processor 241 and a memory 242 with software 243 stored thereon (e.g., dynamic elevator door control software) and communicates with at least one sensor 245. The door control subsystem 240 communicates via a network 250 of the system 200 with the mobile device 220. Thus, the system 200 supports and communicates signals between the mobile device 220, the door control subsystem 240, the network 250, and elements therein to support passenger detecting, passenger assigning, elevator calling, door controlling, and notifying operations described herein.

The system 200 implements dynamic elevator door control based on passenger data comprising at least a number of passengers presently travelling to a floor and a number of passengers awaiting to board at the floor (such as the user 201). The system 200 and elements therein may take many different forms and include multiple and/or alternate components and facilities. The system 200 is only one example and is not intended to suggest any limitation as to the scope of use or operability of embodiments described herein (indeed additional or alternative components and/or implementations may be used). While single items are illustrated for the system 200 (and other items), these representations are not intended to be limiting and thus, any items may represent a plurality of items. For instance, the at least one sensor 245 is representative of a plurality of sensors located in the lobby 203 and the elevator 207 that detect the passengers/user, accompanying luggage, and special accommodations. Special accommodations include passengers with mobility concerns due to age (e.g., babies, children, and senior citizens) and special physical needs (e.g., a pregnant passenger and passengers in wheelchairs, using walkers, using crutches, and driving scooters).

In general, the system 200 enhances an experience of and improves safety for the user 201 through implementing and managing dynamic elevator door control by determining a door operational time to be implemented by the door control subsystem 240. In this regard, the door control subsystem 240 utilizes an average user travel speed based on a health profile of the user 201 to determine an individual time interval for that user 201. Further, depends on the number of passengers, the system 200 can adjust a door close time, dynamically. Note that the number of passengers travelling to/from a particular floor can be acquired from automated elevator calls generated by the mobile device 220 and or hall calls from the lobby 203. The technical effects and benefits of the system 200 include increasing safety for passengers, e.g., by avoiding situation where the door 209 automatically begins to close while the user 201 is boarding.

In accordance with one or more embodiments of the disclosure herein, the door control subsystem 240 is an example of the elevator system 101 of FIG. 1. In this regard, for example, the door control subsystem 240 includes electromechanical arrangements (e.g., a controller and/or computing device that communicates with at least one motor) that control speed, position, and door operation of the elevator 207.

The door control subsystem 240 is in the form of a general-purpose computing device that is improved upon by the operation and functionality of the embodiments described herein. As shown in FIG. 2, the components of the door control subsystem 240 includes, but are not limited to, the processor 241 and the memory 242 with software 243 stored thereon.

The mobile device 220 can be any computing device for operating the software 223 and interacting with the system 200. The mobile device 220 can include a global positioning system or other location technology. The mobile device 220 is only one example of a suitable computing node and is not intended to suggest any limitation as to the scope of use or operability of embodiments described herein (indeed additional or alternative components and/or implementations may be used). That is, the mobile device 220 and elements therein may take many different forms and include multiple and/or alternate components and facilities. For instance, the mobile device 220 can be any and/or employ any number and combination of computing devices and networks utilizing various communication technologies, as described herein. Examples of the mobile device 220 include a smart watch, a wearable computing device, a mobile phone, a smart phone, a tablet computer, a laptop, etc. As shown in FIG. 2, the components of the mobile device 220 includes, but are not limited to, the processor 221 and the memory 222.

The processors 221, 241 include any processing hardware, software, or combination of hardware and software (utilized by the mobile device 220 and the door control subsystem 240, respectively) that carries out the computer readable program instructions by performing arithmetical, logical, and/or input/output operations. Examples of the processors 221, 241 include, but are not limited to an arithmetic logic unit, which performs arithmetic and logical operations; a control unit, which extracts, decodes, and executes instructions from a memory; and an array unit, which utilizes multiple parallel computing elements.

The memories 222, 242 are examples of a tangible device that retains and stores computer readable program instructions or at least one program product (e.g., the software 223, 243, respectively) for use by the processors 221, 241 to carry out the operations of embodiments herein. The memories 222, 242 can include a variety of computer system readable media. Such media may be any available media that is accessible and it includes both volatile and non-volatile media, removable and non-removable media.

Each of the software 223 and the software 243 is a set of computer readable instructions stored in the memories 222, 242, respectively, along with an operating system, one or more application programs, other program modules, and program data. In this regard, the processors 221, 241 execute the software 223 and the software 243 on the memories 222, 242, thereby performing one or more processes defined herein. The software 223, more particularly, causes the mobile device 220 to generate elevator calls, support one or more user interfaces, communicate location information and health profiles to the door control subsystem 240, generate health profile information 240, and provide notifications to the user 201, such as is described herein with reference to FIGS. 3-4. The health profile can be stored on the memory 222 of the mobile device 220 and include pedometer data generated by the mobile device 220, along with age and/or physical need that indicate special accommodations. The pedometer data can further include an average user travel speed, which can be used to determine an individual time interval for that user. The software 243, more particularly, causes the door control subsystem 240 to procure passenger data comprising a number of passengers presently travelling to a floor and a number of passengers awaiting to board at the floor; determine a door operational time based on the passenger data; and implement the door operational time to dynamically cause doors providing access to the at least one elevator to remain open for a duration of the door operational time, such as is described herein with reference to FIGS. 3-4. Examples of notifications may include, but are not limited to, application prompts, text messaging, audio alerts, electronic mail, interface alerts, instant messaging, and the like.

The at least one sensor 245 can be any device that detect a location of the mobile device 220, the user 201, a number of passengers in the lobby 203, a number of passengers in the elevator 207. In accordance with one or more embodiments, the at least one sensor 245 utilizes software to trigger a response within the system as the mobile device 220 enters, leaves, and/or moves through the doors 209. Examples of the at least one sensor 245 is a camera with image recognition technology that can detect a mobility aid, such as wheelchairs, crutches, scooters, etc.

The network 250 can be a distributed cloud computing environment (e.g., a cloud distribution system) where tasks are performed by remote processing devices that are linked through a communications within the network 250. The network 250 can comprise hardware and/or software that are similar to the mobile device 220 described herein. In the network 250, program modules may be located in both local and remote computer system storage media including memory storage devices. Operations of the system 200 will now be described with respect to FIGS. 3-4.

Figure 3:
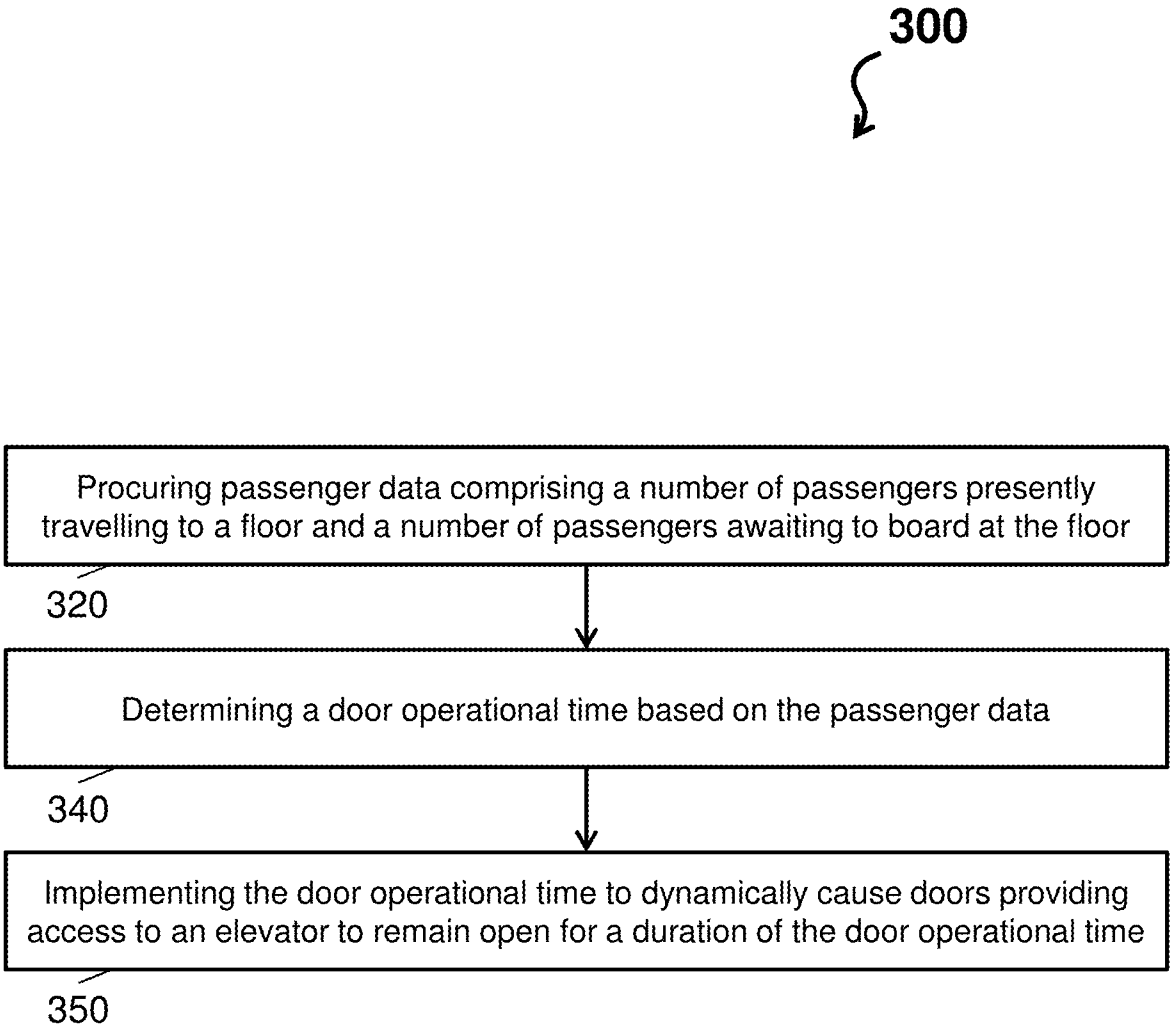
FIG. 3 depicts a process flow of a system for dynamic elevator door control in accordance with one or more embodiments.

FIG. 3 depicts a process flow 300 of the system 200 for dynamic elevator door control in accordance with one or more embodiments. More particularly, the process flow 300 is a computer-implemented method for dynamic elevator door control by the system 200.

The process flow 300 begins at block 320, where the system 200 procures passenger data comprising a number of passengers presently travelling to a floor and a number of passengers awaiting to board at the floor (e.g., the user 201). The passenger data can also be derived from health profile information of one or more users based on one or more elevator calls.

At block 340, where the system 200 determines a door operational time based on the passenger data. The door operational time is summation of one or more individual time interval corresponding to a total passenger number based on the number of passengers presently travelling to the floor and the number of passengers awaiting to board at the floor. The individual time interval can be a default time value, such as two seconds. The individual time interval is adjustable based on user input, passenger need, and special accommodations.

At block 360, where the system 200 implements the door operational time to dynamically cause doors (e.g., the doors 209) providing access to an elevator (e.g., the elevator 207) to remain open for a duration of the door operational time.

Figure 4:
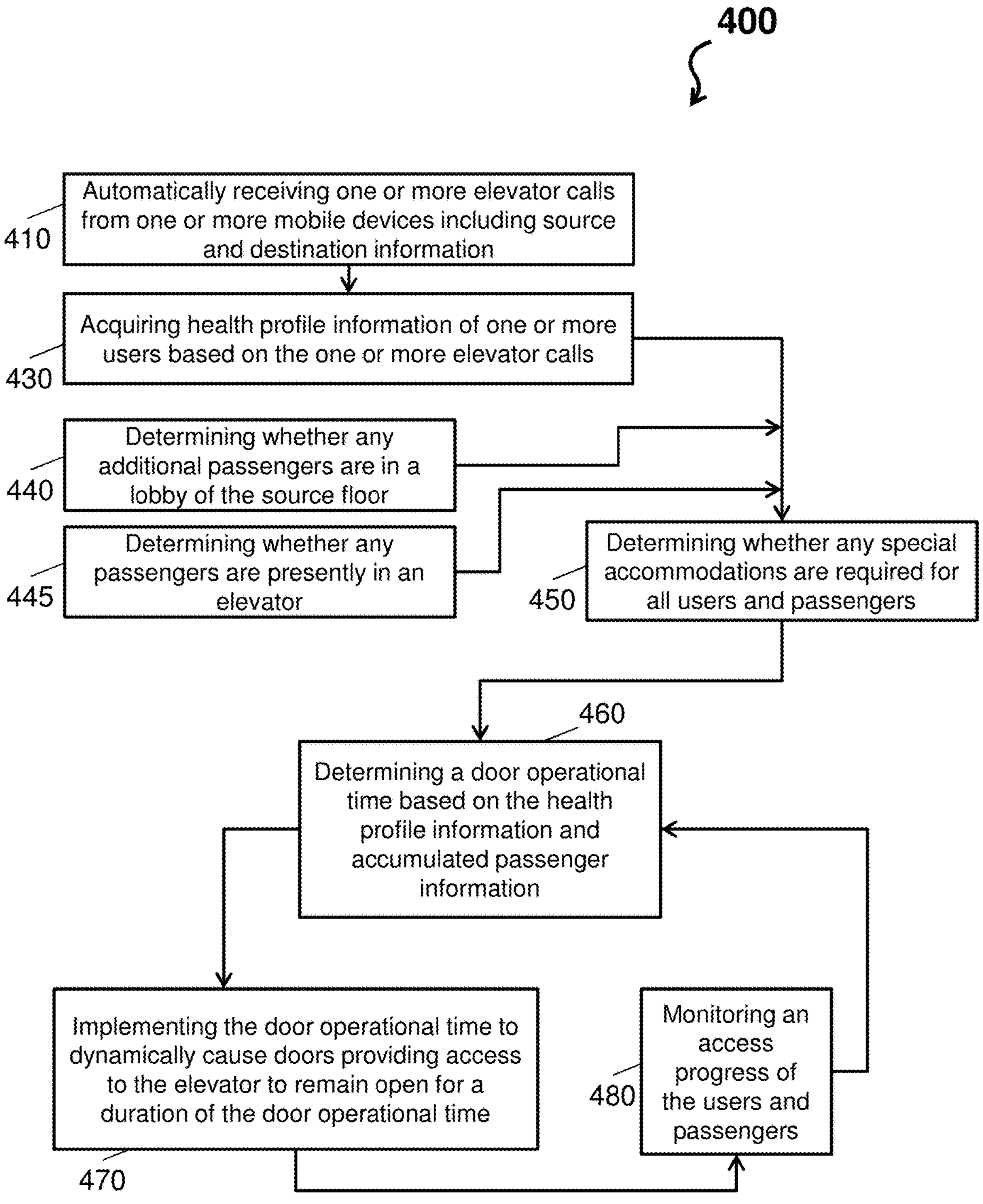
FIG. 4 depicts a process flow of a system for dynamic elevator door control in accordance with one or more embodiments.

FIG. 4 depicts a process flow 400 of a system 200 for dynamic elevator door control in accordance with one or more embodiments. More particularly, the process flow 400 is a computer-implemented method for dynamic elevator door control by the system 200. The process flow 400 begins at block 410, where the system 200 automatically receives one or more elevator calls from one or more mobile devices including source and destination information.

At block 430, the system 200 acquires health profile information of one or more users based on the one or more elevator calls. The health profile information can be acquired directly from user devices (e.g., the mobile device 220) possessed by the passengers (e.g., the user 201). At block 440, the system 200 determines whether any additional passengers are in the lobby 203 of the source floor. For each passenger in the lobby 203, the system 200 can accumulate an additional individual time interval. The system 200 can detect a number of passenger via the at least one sensor 245.

At block 445, the system 200 determines whether any passengers are presently in the elevator 207. For each passenger in the elevator 207, the system 200 can accumulate an additional individual time interval. The system 200 can detect a number of passenger in the elevator 207 via the at least one sensor 245. At block 450, the system 200 determines whether any special accommodations are required for all users and passengers. For instance, if the passengers include a common passenger and an elderly passenger, then the individual time interval can respective include a default time interval for the common passenger and an increased time interval for the elderly passenger. The system 200 can determine the passenger status based on the health profile information.

At block 460, the system 200 determines a door operational time based on the health profile information and accumulated passenger information.

At block 470, the system 200 implements the door operational time to dynamically cause doors (e.g., the doors 209) providing access to an elevator (e.g., the elevator 207) to remain open for a duration of the door operational time. At block 480, the system 200 monitors an access progress of the users and passengers. The system 200 monitors an access progress of the elevator 207 for the duration of the door operational time to determine whether to dynamically increase the door operational time. For instance, if a passenger is taking longer to exit or board the elevator 207 then the determined door operation time (e.g., due to the passenger finishing a conversation), the process flow 400 can return to block 460 and dynamically add time to the door operational time to avoid door hitting to the passenger.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for dynamic elevator door control implemented by a system comprising at least one elevator, the method comprising:

procuring, by the system, passenger data comprising a number of passengers presently travelling to a floor and a number of passengers awaiting to board at the floor, wherein the passenger data includes an average user travel speed based on a passenger health profile;

determining, by the system, a door operational time based on the passenger data; and implementing, by the system, the door operational time to dynamically cause doors providing access to the at least one elevator to remain open for a duration of the door operational time;

wherein the system monitors an access progress of the at least one elevator for the duration of the door operational time to determine whether to dynamically increase the door operational time.

2. The method of claim 1, wherein the door operational time is summation of one or more individual time intervals corresponding to a total passenger number based on the number of passengers presently travelling to the floor and the number of passengers awaiting to board at the floor.

3. The method of claim 2, wherein the one or more individual time interval comprises a default time interval for a common passenger and an increased time interval for an elderly passenger.

4. The method of claim 3, wherein the default time value is two seconds.

5. The method of claim 1, wherein the system automatically receives one or more elevator calls from one or more mobile devices including source and destination information, the system being in communication with the one or more mobile devices via a network.

6. The method of claim 5, wherein the passenger data is derived from health profile information of the one or more users based on the one or more elevator calls.

7. The method of claim 1, wherein the system determines whether any special accommodations are required for the passengers presently travelling to the floor and the passengers awaiting to board at the floor.

8. The method of claim 7, wherein the special accommodation are determined by at least one sensor utilizing image recognition technology that detects a mobility aid.

9. The method of claim 1, wherein the system detects the number of passengers awaiting to board at the floor based on a sensor detects one or more users in a lobby of the floor.

10. A system for dynamic elevator door control, the system comprising at least one elevator, the system being configured to:

procure passenger data comprising a number of passengers presently travelling to a floor and a number of passengers awaiting to board at the floor, wherein the passenger data includes an average user travel speed based on a passenger health profile;

determine a door operational time based on the passenger data; and implement the door operational time to dynamically cause doors providing access to the at least one elevator to remain open for a duration of the door operational time;

wherein the system monitors an access progress of the at least one elevator for the duration of the door operational time to determine whether to dynamically increase the door operational time.

11. The system of claim 10, wherein the door operational time is summation of one or more individual time intervals corresponding to a total passenger number based on the number of passengers presently travelling to the floor and the number of passengers awaiting to board at the floor.

12. The system of claim 11, wherein the one or more individual time interval comprises a default time interval for a common passenger and an increased time interval for an elderly passenger.

13. The system of claim 12, wherein the default time value is two seconds.

14. The system of claim 10, wherein the system automatically receives one or more elevator calls from one or more mobile devices including source and destination information, the system being in communication with the one or more mobile devices via a network.

15. The system of claim 14, wherein the passenger data is derived from health profile information of the one or more users based on the one or more elevator calls.

16. The system of claim 10, wherein the system determines whether any special accommodations are required for the passengers presently travelling to the floor and the passengers awaiting to board at the floor.

17. The system of claim 16, wherein the special accommodation are determined by at least one sensor utilizing image recognition technology that detects a mobility aid.

18. The system of claim 10, wherein the system detects the number of passengers awaiting to board at the floor based on a sensor detects one or more users in a lobby of the floor.

* * * * *